(12) United States Patent
Tripathi et al.

(10) Patent No.: US 11,480,656 B2
(45) Date of Patent: Oct. 25, 2022

(54) FLEXIBLE CONFIGURATION FOR A RADAR MONOLITHI MICROWAVE INTEGRATED CIRCUIT (MMIC)

(71) Applicant: Infineon Technologies AG, Neubiberg (DE)

(72) Inventors: Pranava Tripathi, Linz (AT); Alexander Girlinger, Niederkappel (AT); Rene Kobler, Linz (AT); Alexander Melzer, Neutillmitsch (AT); Andreas Voggeneder, Schwertberg (AT)

(73) Assignee: Infineon Technologies AG, Neubiberg (DE)

( * ) Notice: Subject to any disclaimer, the term of this patent is extended or adjusted under 35 U.S.C. 154(b) by 243 days.

(21) Appl. No.: 16/880,306

(22) Filed: May 21, 2020

(65) Prior Publication Data
US 2021/0364598 A1  Nov. 25, 2021

(51) Int. Cl.
*G01S 7/40* (2006.01)
*G01S 7/03* (2006.01)
*G01S 7/35* (2006.01)

(52) U.S. Cl.
CPC .......... *G01S 7/40* (2013.01); *G01S 7/03* (2013.01); *G01S 7/35* (2013.01); *G01S 7/4017* (2013.01)

(58) Field of Classification Search
CPC ..... G01S 7/40; G01S 7/03; G01S 7/35; G01S 7/4017; G01S 7/032; H01L 2924/14; H04B 5/02; H04B 1/3838
See application file for complete search history.

(56) References Cited

U.S. PATENT DOCUMENTS

| | | | | |
|---|---|---|---|---|
| 5,412,414 A | * | 5/1995 | Ast | G01S 7/4017 342/372 |
| 8,847,814 B2 | * | 9/2014 | Himmelstoss | G01S 7/03 342/175 |
| 10,435,030 B2 | * | 10/2019 | Vaucher | G01R 31/005 |
| 10,591,585 B2 | * | 3/2020 | Steinbuch | G01S 13/931 |
| 2019/0250247 A1 | | 8/2019 | Schmid et al. | |
| 2019/0293784 A1 | | 9/2019 | Khalid et al. | |
| 2020/0025870 A1 | | 1/2020 | Melzer et al. | |

\* cited by examiner

*Primary Examiner* — Bernarr E Gregory
*Assistant Examiner* — Yonghong Li
(74) *Attorney, Agent, or Firm* — Harrity & Harrity, LLP

(57) ABSTRACT

A method of configuring a radar monolithic microwave integrated circuit (MMIC) and executing configured commands includes receiving and storing a plurality of configuration commands corresponding to unique time-dependent functions, each configuration command corresponding to a different one of the unique time-dependent functions; generating a unique command handle for each configuration command; transmitting the unique command handle for each configuration command to a controller; receiving and storing a bundled configuration command comprising a plurality of unique command handles corresponding to a set of configuration commands; generating a unique bundled command handle for the bundled configuration command; transmitting the unique bundled command handle to the controller; and receiving an execute command that includes the unique bundled command handle, where the execute command triggers execution of an execution flow of the unique time-dependent functions corresponding to the set of configuration commands associated with the unique bundled command handle.

22 Claims, 5 Drawing Sheets

FLEXIBLE CONFIGURATION FOR A RADAR MONOLITHI MICROWAVE INTEGRATED CIRCUIT (MMIC)

BACKGROUND

Modern radar devices such as radar range and velocity sensors can be integrated in so-called monolithic microwave integrated circuits (MMICs). Radar sensors may be applied, for example, in the automotive sector, where they are used in so-called advanced driver assistance systems (ADAS) such as, for example, "adaptive cruise control" (ACC) or "radar cruise control" systems. Such systems may be used to automatically adjust the speed of an automobile so as to maintain a safe distance from other automobiles travelling ahead. Radar sensors may also be used for emergency braking, parking assistance, and blind spot detection. However, RF circuits are also used in many other fields such as RF communication systems.

A radar MMIC (sometimes referred to as single chip radar) may incorporate all core functions of the RF frontend of a radar transceiver (e.g., local oscillator, power amplifiers, low-noise amplifiers (LNA), mixers, etc.), the analog preprocessing of the intermediate frequency (IF) or base band signals (e.g., filters, amplifiers, etc.), and the analog-to-digital conversion in one single package. The RF frontend usually includes multiple reception and transmission channels, particularly in applications in which beam steering techniques, phased antenna arrays, etc. are used. In radar applications, phased antenna arrays may be employed to sense the incidence angle of incoming RF radar signals (also referred to as "Direction of Arrival", DOA).

A microcontroller acts as a supervisor for a radar MMIC by sending commands and receiving responses over one or more communication channels (e.g., a serial peripheral interface (SPI)). To achieve the economy of scale, radar MMICs are designed to be highly configurable to cater to the different radar applications with different operating modes. The high configurability of radar MMICs results in increased communication traffic between the MMIC and a microcontroller and further results in additional processing payload to process the many commands and responses required to properly configure the MMIC during the radar operation. The increased traffic and payload add to the design complexity to achieve the radar operation in real-time.

In view of the above, an improved system that reduces design complexity to achieve the radar operation in real-time by reducing the communication traffic and execution payload between the microcontroller and the MMIC may be desirable.

SUMMARY

Embodiments provide a method for and a device for reception monitoring of a reception signal path of a radio frequency (RF) circuit.

One or more embodiments provide a radar monolithic microwave integrated circuit (MMIC) that includes at least one of a transmit channel for transmitting radar signals or a receive channel for receiving reflected radar signals; and a configuration and sequencing circuit configured to receive and store a plurality of configuration commands corresponding to unique time-dependent functions, each configuration command corresponding to a different one of the unique time-dependent functions, where the configuration and sequencing circuit is configured to generate a unique command handle for each configuration command, and transmit the unique command handle for each configuration command to a controller. The configuration and sequencing circuit is further configured to receive and store a bundled configuration command comprising a plurality of unique command handles corresponding to a set of configuration commands, generate a unique bundled command handle for the bundled configuration command, and transmit the unique bundled command handle to the controller. The configuration and sequencing circuit is further configured to receive an execute command from the controller that includes the unique bundled command handle, where the execute command triggers the configuration and sequencing circuit to perform an execution flow of the unique time-dependent functions corresponding to the set of configuration commands associated with the unique bundled command handle.

One or more embodiments provide a radar system that includes a controller and a radar monolithic microwave integrated circuit (MMIC. The controller is configured to generate a plurality of configuration commands corresponding to unique time-dependent functions, each configuration command corresponding to a different one of the unique time-dependent functions, generate a plurality of a bundled configuration commands, each corresponding to a unique set of configuration commands, and generate a plurality of execute commands, each corresponding to a different one of the plurality of a bundled configuration commands. The radar MMIC includes at least one of a transmit channel for transmitting radar signals or a receive channel for receiving reflected radar signals; and a configuration and sequencing circuit configured to receive and store the plurality of configuration commands received from the controller, where the configuration and sequencing circuit is configured to generate a unique command handle for each configuration command, and transmit the unique command handle for each configuration command to the controller. The configuration and sequencing circuit is further configured to receive and store a bundled configuration command received from the controller, the bundled configuration command comprising a plurality of unique command handles that indicate the unique set of configuration commands, generate a unique bundled command handle for the bundled configuration command, and transmit the unique bundled command handle to the controller. The configuration and sequencing circuit is further configured to receive an execute command from the controller that includes the unique bundled command handle, where the execute command triggers the configuration and sequencing circuit to perform an execution flow of the unique time-dependent functions corresponding to the set of configuration commands associated with the unique bundled command handle.

One or more embodiments provide a method of configuring a radar monolithic microwave integrated circuit (MMIC) and executing configured commands. The method includes receiving and storing a plurality of configuration commands corresponding to unique time-dependent functions, each configuration command corresponding to a different one of the unique time-dependent functions; generating a unique command handle for each configuration command; transmitting the unique command handle for each configuration command to a controller; receiving and storing a bundled configuration command comprising a plurality of unique command handles corresponding to a set of configuration commands; generating a unique bundled command handle for the bundled configuration command; transmitting the unique bundled command handle to the controller; and receiving an execute command that includes the unique bundled command handle, where the execute command triggers execution of an execution flow of the unique time-dependent functions corresponding to the set of configuration commands associated with the unique bundled command handle.

BRIEF DESCRIPTION OF THE DRAWINGS

Embodiments are described herein making reference to the appended drawings.

DETAILED DESCRIPTION

Figure 1:
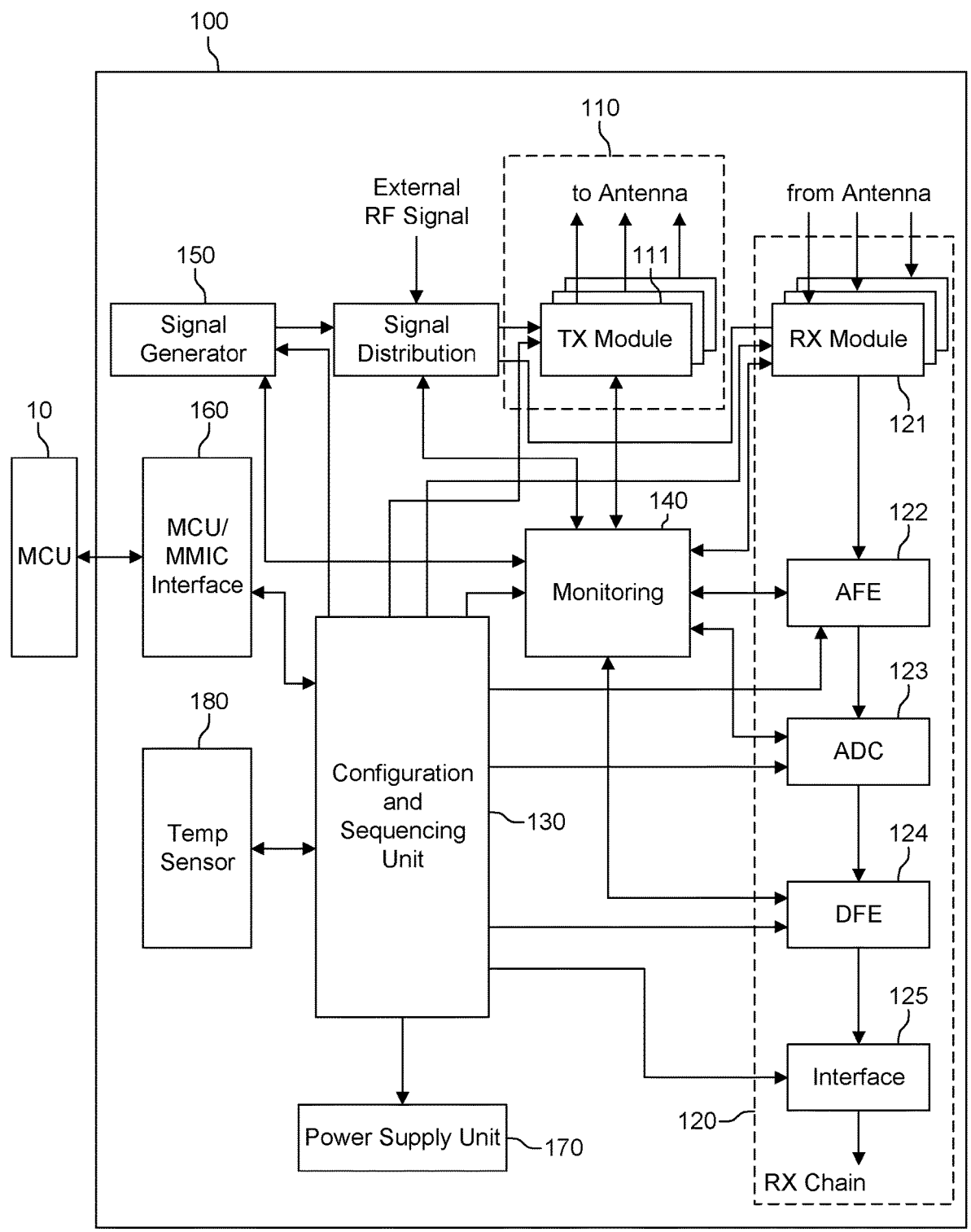
FIG. 1 is a schematic block diagram a radar system according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a CD-ROM, DVD, Blu-ray disc, a RAM, a ROM, a PROM, an EPROM, an EEPROM, a FLASH memory, or an electronic memory device.

Each of the elements of the present disclosure may be configured by implementing dedicated hardware or a software program on a memory controlling a processor to perform the functions of any of the components or combinations thereof. Any of the components may be implemented as a central processing unit (CPU) or other processor reading and executing a software program from a recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPGAs), programmable logic controller (PLC), or other equivalent integrated or discrete logic circuitry.

Accordingly, the term "processor," as used herein refers to any of the foregoing structures or any other structure suitable for implementation of the techniques described herein. A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

FIG. 1 shows a schematic block diagram of a radar system according to one or more embodiments. The radar system includes a semiconductor chip 100 comprising a transmitter 110 including at least one transmit channel 111 for radar signals and/or at least one receive channel 120 for radar signals and a microcontroller (MCU) 10. The semiconductor chip 100 can thus be regarded as part of a radar sensor or part of a radar system. More particularly, the semiconductor chip 100 is a radar monolithic microwave integrated circuit (MMIC).

The transmit channel 111 comprises one or more circuit components and is configured to generate one or more radar transmission signals and to output the latter to one or more antennas. As indicated in FIG. 1, the transmitter 110 can comprise one or more the transmit channels 111. The receive channel 120 comprises one or more circuit components and is configured to receive and process one or more radar reception signals from one or more antennas. As indicated in FIG. 1, the receive channel 120 can comprise one or more receivers 121, an analog front-end 122, an analog-to-digital converter (ADC) 123, a digital front-end 124, and an interface 125.

The analog front-end 122 may include all the circuit components needed for RF signal processing. Such circuit components may (but need not necessarily) include, for example, a local oscillator (LO), RF power amplifiers, low noise amplifiers (LNAs), directional couplers such as rat-race-couplers and circulators, and mixers for the down-conversion of RF signals into the base-band or an intermediate frequency (IF) band.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several transmission (TX) and reception (RX) channels, which among others allows the measurement of the direction (direction of arrival (DoA)), from which the radar echoes are received.

In the case of a frequency-modulated continuous-wave (FMCW) radar system, the transmitted RF signals radiated by the TX antenna 5 are in the range between approximately 20 GHz and 100 GHz (e.g. in the frequency band 21 to 26 GHz or in the frequency band 76 to 81 GHz). As mentioned, the RF signal received by the RX antenna includes the radar echoes, i.e., the signal back-scattered at the so-called radar targets.

The received RF signals are down-converted into the base band (or the IF band) and further processed in the base band using analog signal processing at the analog front-end 122, which basically includes filtering and amplification of the base-band signal. It will be appreciated that if the received RF signals are down-converted into the IF band, the base band signal processing chain of the analog front-end 122 may be referred to as an IF signal processing chain. Thus, the processing chain of the analog front-end 122 may, in general, be referred to as an analog signal processing chain.

The base-band signal is finally digitized using one or more analog-to-digital converters (ADC) 123 and further processed in the digital domain at the digital front-end 124. The digital front-end 124 includes a digital signal processing chain implemented, e.g., in digital signal processor (DSP)).

Furthermore, semiconductor chip 100 comprises a configuration and sequencing circuit 130 configured centrally to handle configuration requests, execution commands, and return responses. The configuration and sequencing circuit 130 includes a firmware (FW) command handler that separately processes configuration requests and execution requests from a microcontroller (MCU) 10. The FW command handler is a processing module of the configuration and sequencing circuit 130. The configuration and sequencing circuit 130 further sends the results of executed configuration and execution requests back to the MCU 10. Here, the MCU 10 is configured as a radar driver for driving the radar functionality of the radar MMIC 100.

In particular, the configuration and sequencing circuit 130 determines a sequencing scheme for (e.g. all) time-dependent functions of the transmitter 110 (i.e., the one or more transmit channels 111) and/or of the receive channel 120 and also to drive circuit elements of the transmitter 110 (i.e., the one or more transmit channels 111) and/or of the receive channel 120 in accordance with the sequencing scheme. A time-dependent function of a transmit channel 111 and/or of the receive channel 120 is a function which is to be performed or carried out in a manner temporally coordinated or synchronized with one or more other time-dependent functions of a transmit channel 111 and/or of a receive channel 120 in order to ensure correct operation of the radar sensor or radar system. Accordingly, the sequencing scheme represents the temporally coordinated or synchronized order of performance of the individual time-dependent functions.

By way of example, the time-dependent functions can comprise a function of a transmit channel 111 relating to generating a radio-frequency radar transmission signal, a function of a receive channel 120 relating to processing a radio-frequency radar reception signal, a monitoring function for one or more circuit components of a transmit channel 111 and/or of a receive channel 120, a monitoring function for a signal processed by a transmit channel 111 and/or a receive channel 120, or a calibration of a transmit channel 111 and/or a receive channel 120.

The configuration and sequencing circuit 130 may receive configuration commands from the microcontroller 10, each being directed to one or more executable command or operation types (e.g., calibrate, ramp, monitor, read, write, etc.) and/or configuration parameters for establishing (i.e., configuring) a configured command. A configured command may comprise a single executable command or operation type, referred to as a "handle", or multiple handles, for example a "batch" or a "fork". Thus, a batch or a fork command may be configured as a bundle of handles (i.e., a bundled configuration command), where each handle corresponds to a different time-dependent function (i.e., unique combination of operation type and parameter set).

A read command instructs the semiconductor chip 100 to read out data from a specific memory location (e.g., an area including one or more specified registers) of the semiconductor chip 100 and transmit the data to the MCU 10. A write command instructs the semiconductor chip 100 to write data received from the MUC 10 to a specific memory location (e.g., an area including one or more specified registers) of the semiconductor chip 100

Each configured command may comprise one or more sequence sets or execution flows of time-dependent functions. Each sequence set may comprise a command type along with one or more configuration parameters that make up a configuration parameter set.

An execution flow may correspond to a batch command that triggers multiple time-dependent functions to be carried out in sequential order, in parallel, or a combination thereof. Alternatively, an execution flow may correspond to a fork command that triggers one or more time-dependent functions to be carried out on a conditional basis based on a trigger condition or event.

Configuration parameters may include calibration parameters for circuit components of the transmit channel 111, frequency parameters for a radar signal, phase parameters, amplitude parameters, filter configurations, or power parameters that are ultimately stored in registers of the configuration and sequencing circuit 130.

The configuration parameters for a calibration command may include calibration parameters for one or more circuit components (e.g. an ADC, a power amplifier, voltage-controlled oscillator (VCO), filter and the like), including circuit components of a transmit channel 111 and a receive channel 120. Calibration parameters may include an offset current, anti-backlash, amplification of the VCO, activation of a signal source, etc.).

The configuration parameters for a monitoring command may include parameters for performing a monitoring function and may identify one or more circuit components targeted for monitoring and from which monitoring feedback is to be received and evaluated.

Furthermore, a radar signal includes a plurality of successive signal sections. Configuration parameters for a ramp command may include frequency parameters for the respective signal section indicating a start frequency $f_{START}$, a stop frequency $f_{STOP}$, phase parameters indicating phase setting for the transmit signals, a duration $T_{RAMP}$ of the successive signal sections, a slope of a frequency ramp, and/or a duration of a pause between adjacent signal sections. By way of example, a signal section can correspond to a ramp segment of a frequency ramp of the radar signal. The ramp segments may be ramps with a rising frequency (up-ramp) or a falling frequency (down-ramp). Whether the ramp segment are up-ramps or down-ramps may be implied by the start frequency and the stop frequency or may be indicated by a configuration parameter.

The configuration parameters for a read command may specify a memory area or a register location of the semiconductor chip 100 from which data is to be read.

The configuration parameters for a write command may specify a memory area or a register location of the semiconductor chip 100 to which data is to be written.

The configuration and sequencing circuit 130 can be implemented for example as a dedicated circuit or a circuit for executing software in conjunction with associated implemented software configured to determine a sequencing scheme and to drive circuit elements of a transmit channel 111 and/or of a receive channel 120 in accordance with the sequencing scheme.

Radar operation of the at least one transmit channel 111 situated on the semiconductor chip 100 and/or of the at least one receive channel 120 situated on the semiconductor chip 100 is controlled centrally by the configuration and sequencing circuit 130 arranged on the semiconductor chip 100. Accordingly, the radar operation on the semiconductor chip 100 can be affected substantially autonomously, i.e., independently of external controllers, on account of the configuration and sequencing circuit 130.

The semiconductor chip 100 can be used for example for a (phase- or frequency-) modulated continuous wave radar system. Accordingly, a transmit channel 111 and/or a receive channel 120 can be part of a modulated continuous wave radar system, for example of an FMCW radar in the automotive field. The configuration and sequencing circuit 130 can accordingly be understood as a central sequencing unit which can coordinate all substantial time-critical functions of the automotive FMCW radar front-end, such that a radar operation is an autonomous process which for example does not necessitate the participation of an external processor for performing the time-critical functions.

In comparison with systems in which the synchronization of functions is distributed amongst a plurality of chips (e.g. a central microcontroller chip for controlling and/or for reconfiguring monitoring functions and also a phase-locked loop chip for providing a desired frequency profile), the development outlay can be lower. On account of the autonomous radar operation of the semiconductor chip 100, a load for a main processor of a radar sensor or of a radar system can be reduced and a higher flexibility can be achieved. Furthermore, a very high synchronism (e.g. greater than in customary processors) can be made possible on account of the possibility for the specific design of the sequencing unit.

In addition to controlling a desired frequency profile of a radar transmission signal, the configuration and sequencing circuit 130 shown in FIG. 1 can control various other aspects of a radar sensor or radar system in a synchronized manner.

By way of example, in the transmitter 110, and specifically in a transmit channel 111, a power amplifier can be switched on and off in a synchronized manner or a phase shift (implemented by a phase shifter) of radar transmission signals can be carried out in a synchronized manner.

The monitoring of a transmit channel 111 and/or of a receive channel 120 can be carried out by a monitoring circuit 140. The latter can accordingly be driven by the configuration and sequencing circuit 130 to trigger or to activate or to deactivate a channel monitoring function in a synchronized manner in accordance with the sequencing scheme. By way of example, monitoring functions can be activated or deactivated in a synchronized manner during a ramp formation, during a calibration (e.g., amplification of a voltage-controlled oscillator), during a cascaded operation, or during a configuration of external components or slaves (e.g. Serial Peripheral Interface (SPI) or demultiplexing (DMUX)).

In the signal generating circuit 150, in a synchronized manner, for example, the bandwidth of a phase-locked loop (PLL) can be set (e.g., charge pump current) or more extensive modulation concepts can be activated or deactivated (e.g., 2-point modulation, resetting current). Likewise, in a synchronized manner, for example, loop filter reset circuits can be activated or deactivated or monitoring functions can be activated or deactivated. Moreover, in a synchronized manner, by way of example, voltages can be roughly set, calibration parameters (e.g., offset current, anti-backlash, amplification of a voltage-controlled oscillator) can be set or a signal source (e.g., when using a plurality of PLLs) can be selected.

In the receiver 121, in a synchronized manner, by way of example, digital or analog filters can be set (resetting, configuration, bypass, etc.) or decimation rates can be set. Low Voltage Differential Signaling (LVDS) modes or calibrations can be chosen in a synchronized manner. Likewise, in a synchronized manner, the receive channel 120 can also be activated or deactivated in its entirety or a reception frame delay can be set. By way of example, the ADC 123 can also be configured, calibrated, activated, or deactivated in a synchronized manner.

Likewise, general purpose inputs/outputs (GPIOs) can be configured in a synchronized manner, circuit components for generating frequency ramps can be triggered or diverse circuit components (e.g., ADC 123) can be switched on or off. Moreover, interrupts can be generated or other chip functionality can be triggered.

In order to synchronize the time-dependent functions presented by way of example above, the configuration and sequencing circuit 130 can comprise an instruction-processing unit (not shown) with a specific instruction set for determining the sequencing scheme. The instruction set can describe the configuration flow over time and be for example similar to the instruction set of a general purpose processor. By way of example, the instruction set can comprise first specific instructions for the configuration of the circuit elements of a transmit channel 111 and/or of a receive channel 120 and also second specific instructions for the configuration of frequency parameters of a radio-frequency radar transmission signal generated by the transmit channel 110.

The configuration and sequencing circuit 130 can thus be understood as a radar-specific sequencing unit having an instruction set associated with a specific purpose in order to handle time-critical configurations in a highly integrated radar chip.

A controller/MMIC interface 160 shown in FIG. 1 can additionally be used to transmit commands and response between the MCU 10 and the configuration and sequencing circuit 130 via a communication channel, such as a serial peripheral interface (SPI), low-voltage differential signaling (LVDS), or another type of communication channel.

A power supply unit 170 supplies power to the chip components and may be configurable by the configuration and sequencing circuit 130.

Various transactions can be performed between the MCU 10 and the configuration and sequencing circuit 130 through the controller/MMIC interface 160. A transaction is defined by one or more messages, sent and received between MCU 110 and the radar MMIC 100 to trigger a command that executes a single or a set of tasks, and to receive the result of the task/s executed.

Each configuration command can be classified into three parts—(i) an execution identifier (EID) that instructs the configuration and sequencing circuit 130 to configure or execute a command (e.g., EID=to create configuration or EID=to execute a handle, etc.) (ii) a command identifier (CID) that defines the type of command (i.e., the time-dependent function) being configured to be performed (e.g., a start ramp, perform calibration, start monitoring, set event conditions, write to memory, read from memory, etc.) and (iii) parameter data (param) that are configuration parameters that further define a configuration for the command type. Thus, a set of configuration parameters can be defined for each CID.

The MCU 10 is configured to generate various configuration commands and transmit the configuration commands to the configuration and sequencing circuit 130. The configuration and sequencing circuit 130 is configured to receive a configuration command, extract the CID and its corresponding configuration parameters, and store the extracted CID and its corresponding configuration parameters in a command registry (i.e., in a memory comprising a plurality of registers). In particular, the configuration and sequencing circuit 130 is configured to create a command handle that the MCU 10 can use to trigger an execution of the configured command that is registered in the command registry. The created handle is mapped to the registered CID and the registered configuration parameters that correspond to the registered CID.

Multiple CIDs of different command types, each with a corresponding set of configuration parameters, may be created and registered in memory (e.g., ROM, RAM, flash memory, etc.). The configuration and sequencing circuit 130 is configured to assign each configured command (i.e., each CID+configuration parameter set) a unique handle. Additionally, multiple CIDs of the same command type may be created, each with a different set of configuration parameters and each assigned by the configuration and sequencing circuit 130 with a unique handle.

The MCU 10 receives the handles from the configuration and sequencing circuit 130 and records the handle in a handle registry. The MCU 10 further includes an application command handler that has access to the stored handles via indexing. The application command handler is a processing module of the MCU 10 and determines which handle or handles are to be executed and transmits an EID (to execute handle(s)) with one or more handles to the configuration and sequencing circuit 130. Such a command instructs the configuration and sequencing circuit 130 to perform an action corresponding to the provided handle(s). This action may include execute handle, create batch, create fork, create loop handle, create loop batch, create loop fork, execute batch, execute fork, execute loop for handle, execute loop batch, execute loop fork, and any combination thereof.

The MCU 10 may be further configured to access the memory area (e.g., a RAM area) of the configuration and sequencing circuit 130 that stores the handles and corresponding configurations, create a copy of the memory area, and store the copy of the memory area in its own memory. The MCU 10 may then load the copy to the configuration and sequencing circuit 130 at, for example, power up of the semiconductor chip 100. As will be demonstrated by the following description, the provided system and methods reduce communication traffic between the MCU 10 and the MMIC 100. In addition, processing payloads are reduced especially during the radar operation, without compromising on configurability of the MMIC.

The communication traffic is reduced by providing additional features in the MMIC 100 to separate configuration of the commands and the execution of the commands; provide customizable templates to encapsulate different configured commands and their execution flow in a single execution command; provide a method to trigger execution of configured command by an additional signal (such as a hardware signal on a digital input pin), by an internal software event, or by a hardware event (e.g., such as frequency ramp completed, set time in a timer elapsed, random access memory (RAM) writing completed). Results stemming from the executed command type may be provided using an SPI channel, an LVDS channel, a digital output pin, etc., of the controller/MMIC interface 160.

Figure 2:
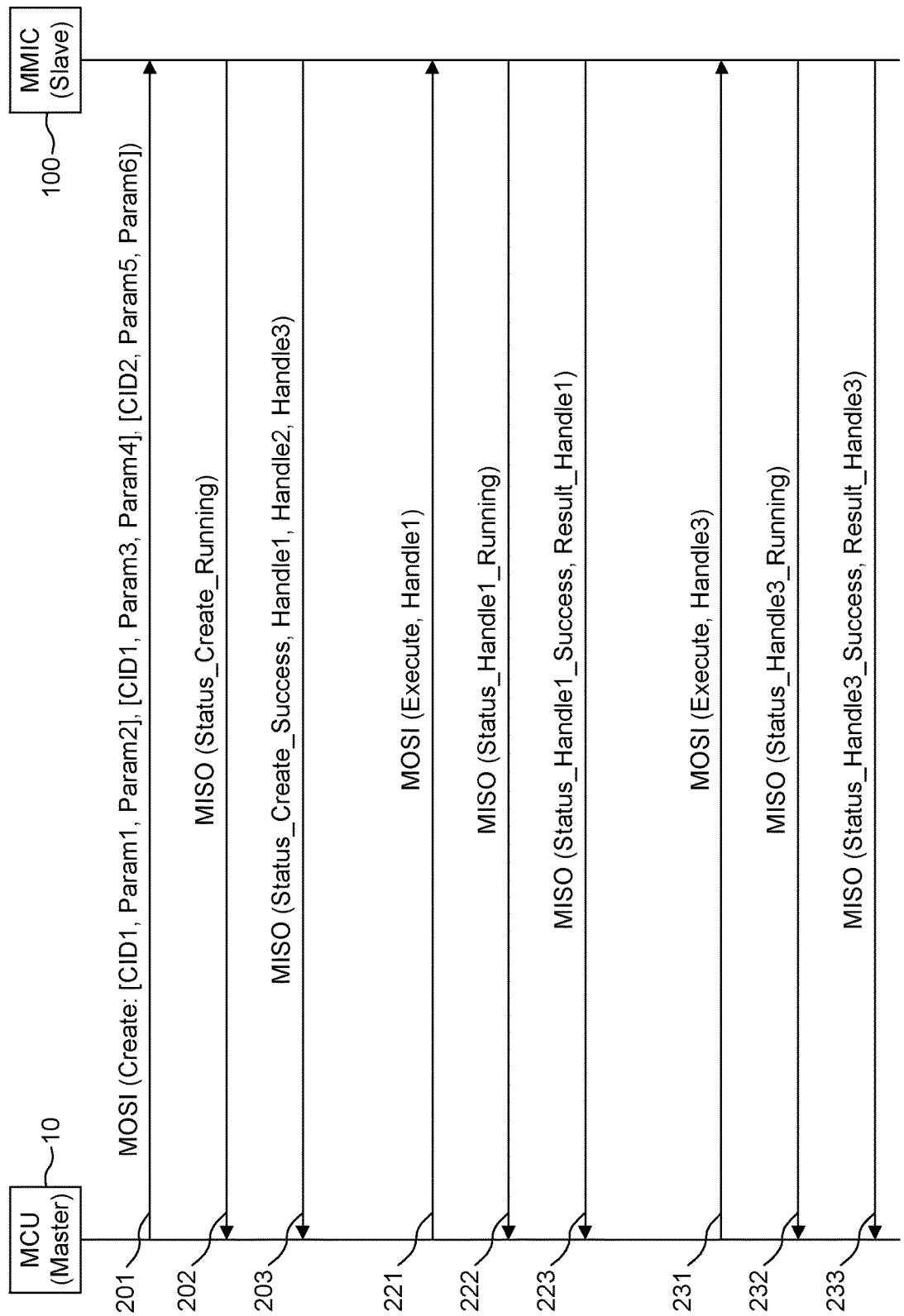
FIG. 2 illustrates a communication exchange between a microcontroller and a monolithic microwave integrated circuit (MMIC) for configuring and executing commands according to one or more embodiments.

FIG. 2 illustrates a communication exchange between the MCU 10 and the MMIC 100 (i.e., the configuration and sequencing circuit 130) according to one or more embodiments. Specifically, FIG. 2 provides an example for creating a plurality of configured commands, each assigned a unique handle, and triggering an execution of the configured commands via a trigger signal (i.e., an execution command) using the appropriate handle. Master Out, Slave In (MOSI) messages and Master In, Slave Out (MISO) messages are exchanged for each transaction.

In a first communication, the MCU 10 transmits a MOSI message 201 instructing the MMIC 100 (i.e., the configuration and sequencing circuit 130) to create (e.g., EID1) three configured commands with the first two configured commands being the same command type identified by CID1 but having different configuration parameters (param1, param2, param3, and param4, respectively). In some cases, different configured commands have some of the same configuration parameters but have at least one different configuration parameter. The third configured command is of a different command type indicated by CID2 and is further assigned its own set of configuration parameters param5 and param6. In this example, one message is used to create three configured commands. However, multiple MOSI messages may be used instead.

Different EIDs may be used, for example, to create a handle, create a batch, create a fork, create a loop for a handle, create a loop for a batch, create a loop for a fork, execute a handle, execute a batch, execute a fork, execute a loop for a handle, execute a loop for a batch, execute a loop for a fork, and so on. For example, EID1 corresponding to "create_handle" may be used preceding the CID and params. Other execution command types may have a unique corresponding EID.

Upon receiving MOSI message 201, the MMIC 110 starts creating the configured commands. Additionally, in a second communication, the MMIC 110 (i.e., the configuration and sequencing circuit 130) transmits a MISO message 202 in response to the create command indicating the status of the create command. Essentially, the MISO message 202 is an acknowledgment (ACK) that the create command was received and being processed.

In a third communication, the MMIC 110 (i.e., the configuration and sequencing circuit 130) transmits a MISO message 203 in response to successfully completing the create command. In addition, the MISO message 203 includes an execution status (e.g., "create_success") indicating that handles were successfully created and includes a command handle for each configured command (e.g., Handle1, Handle2, and Handle3, respectively). Here, the MMIC 100 maps each command handle to its corresponding registered CID and the registered configuration parameters that correspond to the registered CID. Additionally, the MCU 10 registers each command handle in its handle registry.

After the transaction of messages 201-203 is complete, the MCU 10 and the MMIC 100 are configured to execute a configured command via further transactions. By way of example, the MCU 10 may select Handle1 to be executed. In this case, the MCU 10 generates a fourth communication and transmits MOSI message 221 that includes an execution command and the handle identifier for Handle 1.

Upon receiving MOSI message 221, the MMIC 110 uses the handle identifier to look up the registered CID and corresponding configuration parameters for execution, and begins executing the configured command type according to its configuration parameters. In addition, in a fifth communication, the MMIC 110 transmits a MISO message 222 indicating the execution status of Handle1 (i.e., running). Essentially, the MISO message 222 is an ACK that the execution command for Handle1 was received and being executed.

Furthermore, in a sixth communication, the MMIC 110 transmits a MISO message 223 in response to successfully completing the execution of Handle1.

The MISO message 223 includes an execution status (e.g., "Handle1_success") indicating that Handle1 was successfully executed and includes any results from the execution of Handle1, if applicable.

By way of example, the MCU 10 may also select Handle3 to be executed. In this case, the MCU 10 and MMIC 100 generate additional communications, including MOSI message 231 and MISO messages 232 and 233 according to a similar process taken for executing Handle 1.

As can be seen, a configured command can be triggered via a single transaction from the MCU 10. Accordingly, the MMIC 100 is highly configurable to execute different configured commands in a dynamic way according to configuration commands that are separate from execution commands that trigger an execution of those configured commands.

According to this separation, traffic is reduced by configuration data that is transmitted only once. The MCU 10 transmits an execute command by passing a token ("handle"), which is received after configuration of the command. Additionally, the payload at the MMIC 100 is reduced as there is now no need to parse and validate the configuration data while executing the command. Similarly, there is no need to validate a failure of configuration data at the MCU 10 while executing the command since functions have been pre-configured via the creation of various handles.

In addition to creating various handles, two or more handles can be combined in a configuration command to create (i.e., register) different configured batch commands and configured fork commands. A batch command is a sequence of commands (handles) that are to be executed in a sequence and/or in parallel.

A fork command is configured with two or more commands (handles), and the configuration and sequencing circuit 130 monitors for a configured condition (e.g., a trigger event) during execution of one handle before forking to an execution of a different handle based on a monitoring result such as a trigger event. For example, an event monitoring handle may be executed in parallel with another type of handle (e.g., Handle1). If a certain condition (i.e., trigger event) is detected during event monitoring, the configuration and sequencing circuit 130 may switch to a different handle of the same type (e.g., Handle2). It is noted that event monitoring is different from channel monitoring. However, an event monitoring may use the channel monitoring for detecting a certain condition or trigger event.

Alternatively, the configuration and sequencing circuit 130 may monitor via an event monitoring handle for a configured condition (e.g., a trigger event) prior to executing a further handle, and determine which handle selected from at least one handle is to be executed based on a monitoring result (e.g., upon one of two different configured conditions being satisfied). In some cases, the configuration and sequencing circuit 130 may determine which handle selected from at least two handles (e.g., Handle1 or Handle2) is to be executed based on a monitoring result (e.g., upon one of two different configured conditions being satisfied).

By way of example, a fork command may include executing an event monitoring command that monitors a chip temperature of the MMIC 100 via a temperature sensor 180. If the chip temperature is within a first temperature range (e.g., a normal operating temperature range), no additional action may be taken. If the chip temperature is outside the first temperature range or within a second temperature range different from the first temperature range, a first handle or a first sequence (batch) of different handles may be executed.

Different temperature ranges may be used to trigger an execution different hierarchies of handles or handle sequences (batches). For example, if the chip temperature is within a first temperature range, a first handle or a first sequence of different handles may be executed. If the chip temperature is outside the first temperature range or within a second temperature range different from the first temperature range, a second handle or a second sequence of different handles may be executed.

By way of another example, a finer control is provided by using configured fork command. The configured fork command may include executing command X which for example compares if the MMIC temperature is more than a threshold value and then based on the result of command X, execute command Y or command Z. The configured fork command is used to create a smart batch with controls built in it without need of loading any additional executable code in the MMIC 100.

Additionally, a loop command can be configured which establishes a number of loop iterations (e.g., via a counter). A configured loop command can be combined with any of the configured handles, batches, or forks to create a looped handle, a looped batch, or a looped fork, respectively. Thus, a handle can be performed according to the number of iterations of the associated loop command. The same goes for any configured batch or fork. Multiple loop commands can be configured in order to flexibly change the number of iterations to be performed on any given command type.

As noted above, the MCU 10 may be further configured to access the memory area (e.g., a RAM area) of the configuration and sequencing circuit 130 that stores the handles (i.e., command handles, batch handles, fork handles, loop hands, and combinations thereof) and corresponding configurations, create a copy of the memory area, and store the copy of the memory area in its own memory. The MCU 10 may then load the copy to the configuration and sequencing circuit 130 at, for example, power up of the semiconductor chip 100.

Figure 3:
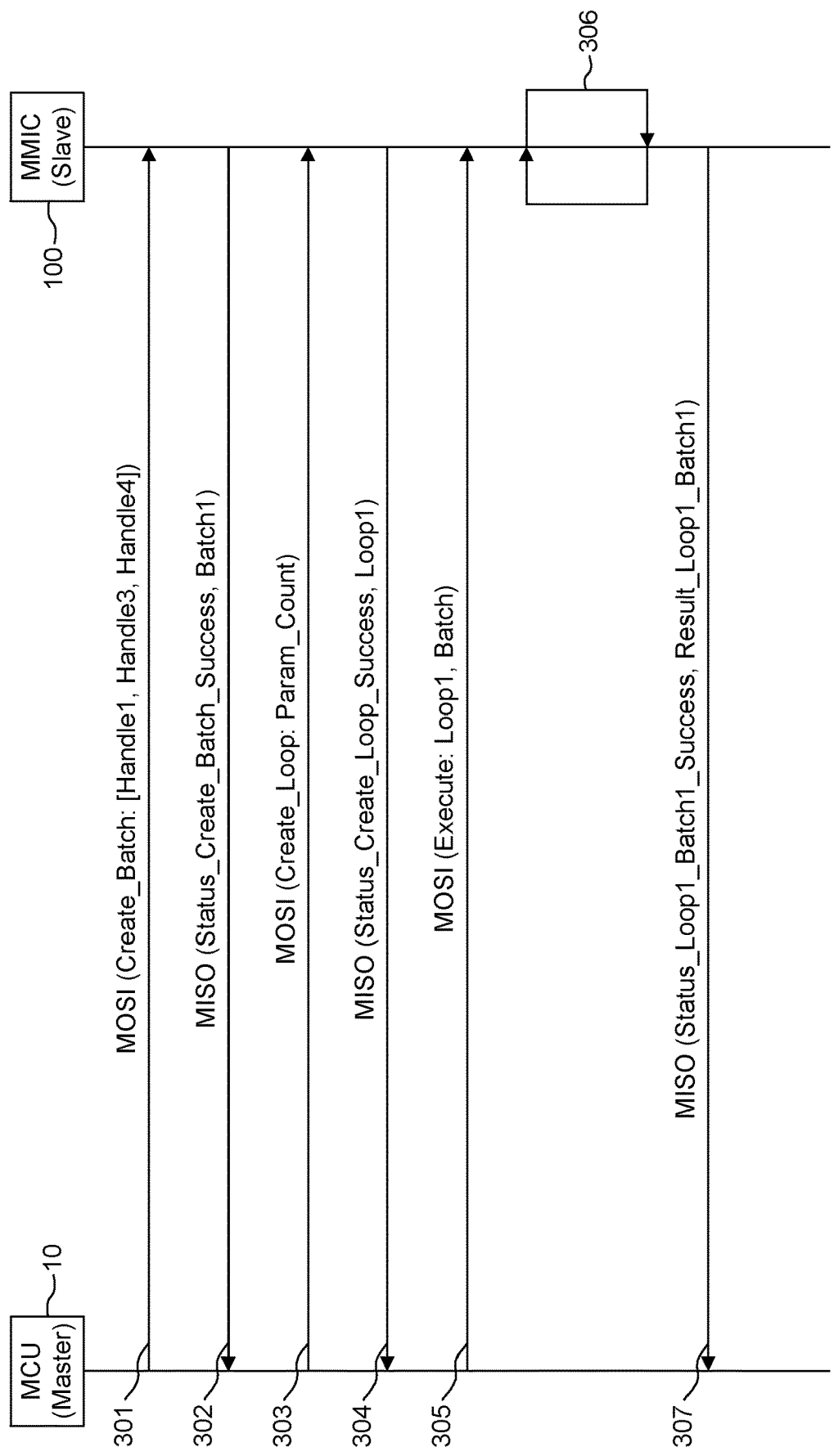
FIG. 3 illustrates a communication exchange between a microcontroller and an MMIC for configuring and executing a looped batch according to one or more embodiments.

FIG. 3 illustrates a communication exchange between the MCU 10 and the MMIC 100 (i.e., the configuration and sequencing circuit 130) for configuring and executing a looped batch according to one or more embodiments. FIG. 3 builds off of the process of creating handles described in FIG. 2. Thus, it is assumed a plurality of handles have already been configured and are ready for execution.

In a first communication, the MCU 10 transmits a MOSI message 301 that includes a configuration command "create_batch" for configuring a batch that comprises a plurality of configured handles. In this example, each handle corresponds to a different command type (i.e., a different CID). However, it is possible to create batch that includes the same command type. Here, the batch includes Handle1, Handle3, and Handle4. Handle1 may correspond to a calibration command (i.e., a calibration CID), Handle3 may correspond to a ramp command (i.e., a ramp CID), and Handle4 may correspond to a channel monitoring command (i.e., a channel monitoring CID). For this batch, the handles will be performed in sequential order as they are listed. Thus, Handle1 is to be executed first, Handle3 is to be executed second after completion of Handle1, and Handle4 is to be executed third after completion of Handle3. In some embodiments, a batch may be configured to execute a plurality of same Handles.

In response to the batch configuration command, MMIC 100 creates the batch, registers the batch in a command registry, and assigns a unique batch handle Batch1. The unique batch handle is mapped to its corresponding handles. In addition, the MMIC 100 transmits a second communication, MISO message 302 that indicates the status of the requested batch. The MISO message 302 indicates that the requested batch command was successfully created and assigned the unique batch handle Batch1. The MCU 10 registers the batch handle in its handle registry.

In a third communication, the MCU 10 transmits a MOSI message 303 that includes a configuration command "create_loop" for configuring a loop according to a count parameter (param_count). The count parameter defines the number of iterations of the loop.

In response to the loop configuration command, MMIC 100 creates the loop, registers the loop in a command registry, and assigns a unique loop handle Loop1. In addition, the MMIC 100 transmits a fourth communication, MISO message 304 that indicates the status of the requested loop. The MISO message 304 indicates that the requested loop command was successfully created and assigned the unique loop handle Loop1. The MCU 10 registers the loop handle in its handle registry.

Once configured, the loop command Loop1 can be combined with any other handle type (i.e., a command handle, batch handle, fork handle, etc.) for execution. In this example, the loop command Loop1 is combined for execution with the batch command Batch1 to execute Batch1 a plurality of times according to the count parameter of Loop1.

The MCU 10 selects Loop1 and Batch 1 for execution and transmits a MOSI message 305 that includes an execution command that identifies loop command Loop1 and batch command Batch1.

In response to receiving the execution command provided by MOSI message 305, the MMIC 100 executes Batch1 (e.g., Handle1→Handle3→Handle4) in an execution loop 306 according to the count parameter of Loop1. When Batch1 is executed for the configured number of iterations, the loop batch is complete and the MMIC 100 transmits a MISO message 307 that indicates that the loop batch Loop1_Batch1 has been successfully executed and provides information on any results of the loop batch.

According to this set up, only three commands are required to be sent from the MCU 10 to the MMIC 100 to execute a loop batch. The first two commands are configuration commands to separately configure the batch and the loop. The third command, separate from the first two commands, is an execution command that selects the desired loop and batch that are to be combined for execution. Accordingly, the number of transactions between the MCU 10 and the MMIC 100 are reduced without compromising on the configuration and execution flexibility of the MMIC 100.

Figure 4:
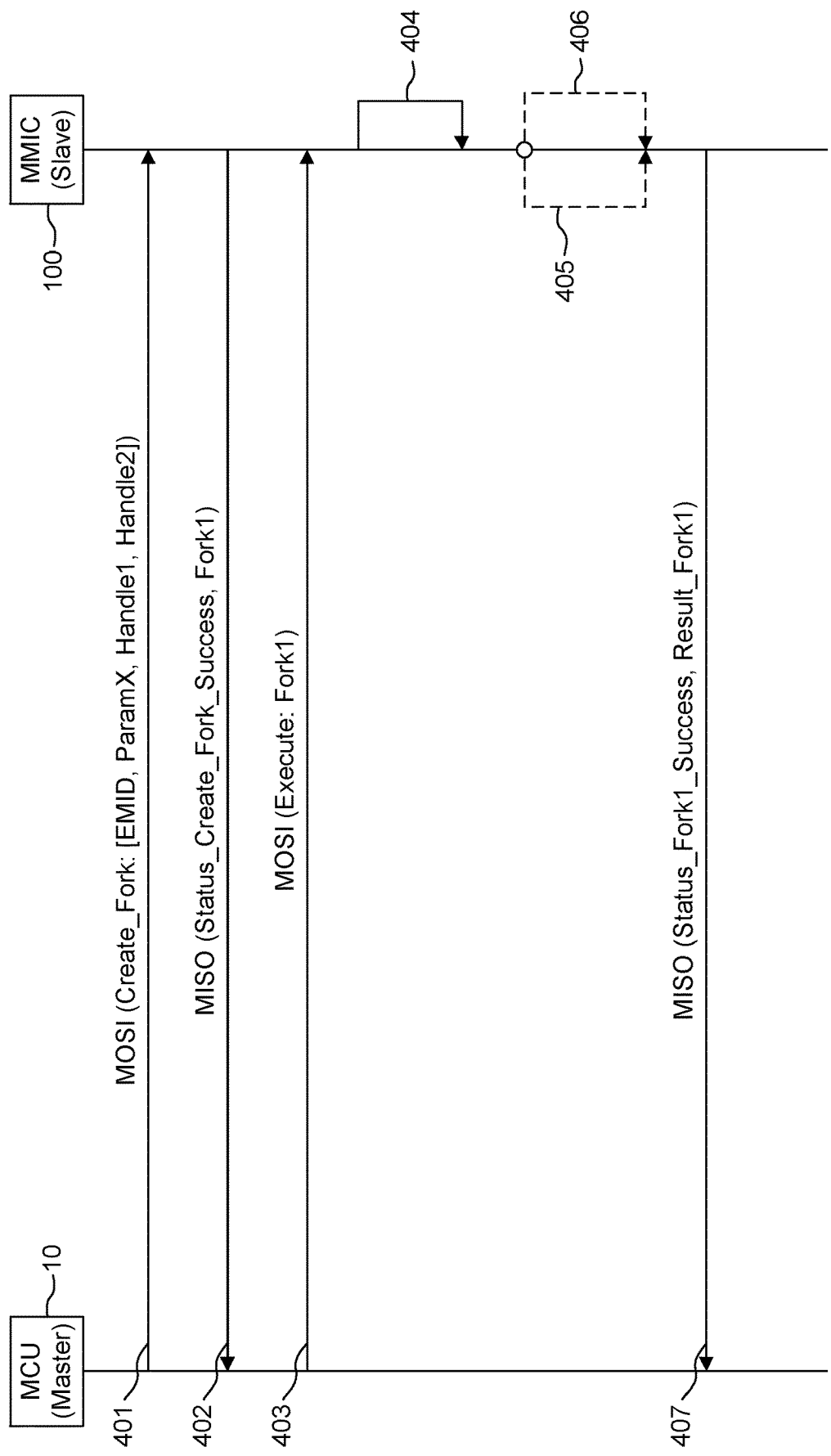
FIG. 4 illustrates a communication exchange between a microcontroller and an MMIC for configuring and executing a fork according to one or more embodiments.

FIG. 4 illustrates a communication exchange between the MCU 10 and the MMIC 100 (i.e., the configuration and sequencing circuit 130) for configuring and executing a fork according to one or more embodiments. FIG. 4 continues a process of creating handles described in FIG. 2. Thus, it is assumed a plurality of handles have already been configured and are ready for execution.

In a first communication, the MCU 10 transmits a MOSI message 401 that includes a configuration command "create_fork" for configuring a fork that comprises an event monitoring ID (EMID), an event monitoring parameter (e.g., paramX), and a plurality of configured handles. The EMID identifies the type of event monitoring selected out of a plurality of event monitoring types. For example, an event monitoring type may be a temperature threshold monitoring that, when executed, includes measuring an internal chip temperature and comparing the measure temperature to a threshold temperature value. The event monitoring parameter defines a parameter, such as the threshold temperature value, for the event monitoring ID. The two handles represent the forked commands such that one handle is executed based on a first condition being met and the other handle is executed based on a second condition being met.

In response to the fork configuration command, MMIC 100 creates the fork, registers the fork in a command registry, and assigns a unique fork handle Fork1. The unique fork handle is mapped to its registered EMID, its event monitoring parameter, and its corresponding handles. In addition, the MMIC 100 transmits a second communication, MISO message 402 that indicates the status of the requested fork. The MISO message 302 indicates that the requested fork command was successfully created and assigned the unique fork handle Fork1. The MCU 10 registers the fork handle in its handle registry.

The MCU 10 selects Fork1 for execution and transmits a MOSI message 403 that includes an execution command that identifies fork command Fork1.

In response to receiving the execution command provided by MOSI message 403, the MMIC 100 executes Fork1 by first performing an execution 404 of the event monitoring command defined by EMID and paramX. Based on the result of that event monitoring, the MMIC 100 selects either Handel or Handle 2 for execution 405 or 406, respectively, and executes the selected command handle. For example, Handel and Handle2 may each correspond to same or different calibration commands with different parameter sets. Thus, a different calibration of circuit components may be performed based on the result of the event monitoring.

When the fork is complete, the MMIC 100 transmits a MISO message 407 that indicates that the Fork1 has been successfully executed and provides information on any results of the fork, including indicating which handle was executed and the result of the handle execution.

According to the above examples, a command module of the configuration and sequencing circuit 130 is configurable so that when a command is to be executed by a hardware signal, internal software or hardware event, the command is ready to be executed. Such commands further provides finer control to execute a command in a batch or a fork for a time critical operation.

Figure 5:
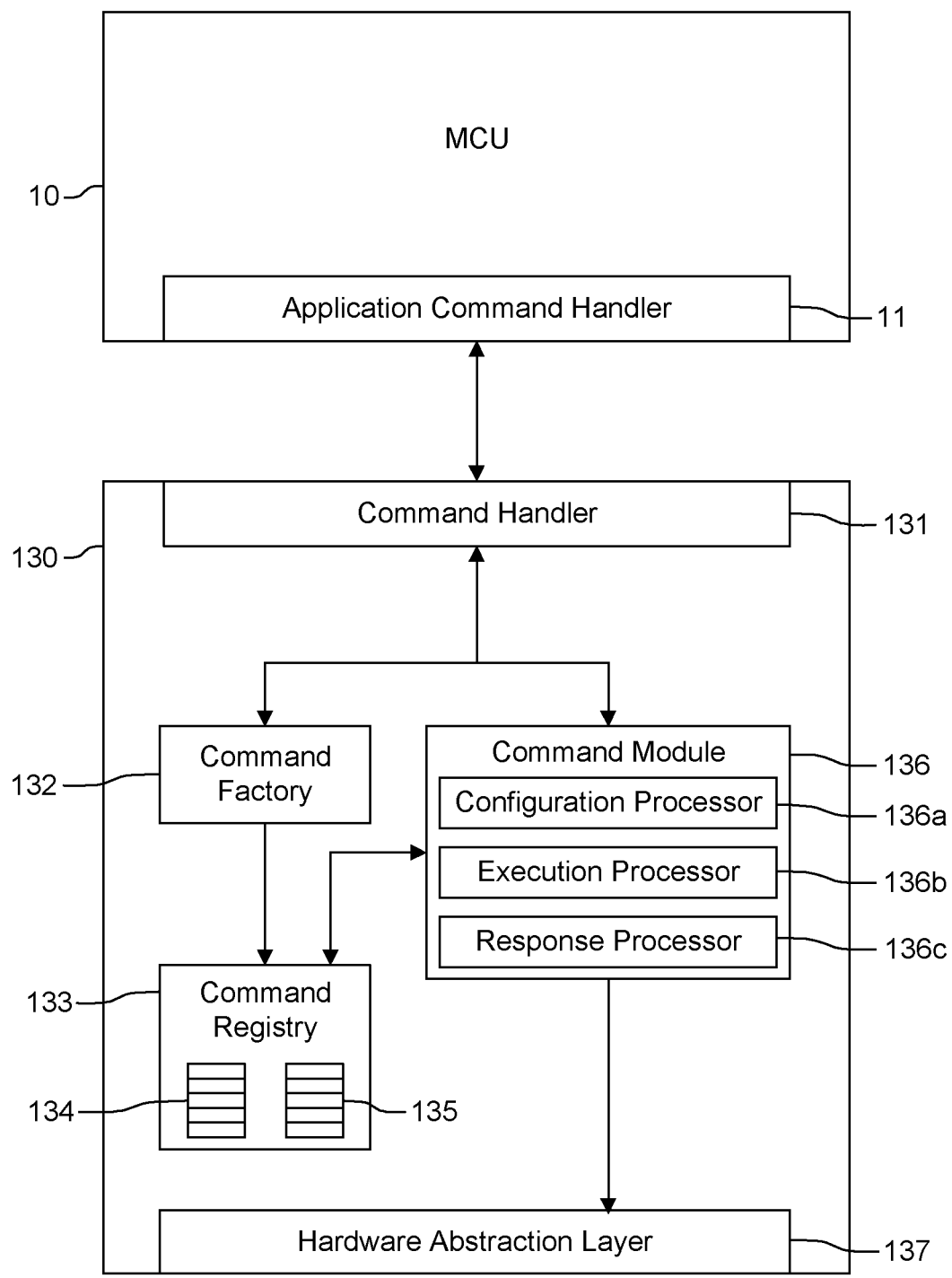
FIG. 5 is a schematic block diagram of an MMIC implementation in a radar system according to one of more embodiments.

FIG. 5 is a schematic block diagram of an MMIC implementation according to one of more embodiments. In particular, the MCU 10 and the configuration and sequencing circuit 130 are shown. The MCU 10 is a host controller that includes an application command handler 11 that perform transactions between the MCU 10 and the configuration and sequencing circuit 130.

The configuration and sequencing circuit 130 includes an command handler 131 that handles (i.e., routes) incoming configuration and execution commands, a command factory 132 that updates or creates commands, a command module 136 that configures commands, executes commands and/or processes the results of commands, a command registry 133, and a hardware abstraction layer (HAL) 137 that is a hardware module interface (e.g., provided in form of registers or firmware) to execute MMIC tasks such as ramp, calibration, channel monitoring, and event monitoring.

The command registry 133 is part of memory that has two sections—a command descriptor section 134 and a command configuration section 135. The command descriptor section 134 is an array of addresses of the command module 136. The index of this array is command identifier (CID). The command configuration section 135 is an array of addresses of valid configuration data. The index of this array is handle.

The command module 136 includes three logically separated parts: a configuration processor 136a, an execution processor 136b, and a response processor 136c. The configuration processor 136a validates the configuration data, stores the data in memory and provides the address where it stores the data. The execution processor 136b executes a command according to the configuration data at a specified location and stores the result to a specified location. The response processor 136c processes the result stored at a specified location. The response processor packages the response messages in a predefined transaction protocol to be sent to the MCU 10. A plurality of command modules 136 may be implemented, for example, by a first command module 136 for monitoring, a second command module 136 for ramping etc.

Each processor 136a, 136b, and 136c is realized either by a hardware block (e.g., using logic gates) or by a software program executed by a processor. Each processor 136a, 136b, and 136c is implemented at different addresses (e.g., memory mapped for a hardware block or a function address for a software program). The processors 136a, 136b, and 136c are triggered by the command handler 131 (e.g., triggering the hardware block or loading the software program address in a program counter of a CPU of the MMIC 100). Before triggering the appropriate processor 136a, 136b, and 136c, the command handler 131 configures the processor with the addresses of the data which the processor should process.

The command handler 131 processes the requests from the MCU 10. There are two request categories—configure and execute. Every configuration request has command ID (CID) and configuration data as one or more parameters. From the CID, the command handler 131 identifies the respective command module 136 from a plurality of command modules in the command descriptor section 134 invokes the configuration part of the command executed by processor 136a at the index specified by the CID in the command descriptor section 134 of command registry 133. If the configuration operation is successful, the command handler 131 stores the address of the configuration data in the command configuration section 135 of the command registry 133 and provides the index at which configuration data is stored as a handle.

Every execute request has a handle as a parameter. The command handler 131 reads the CID from the configuration data stored at the address specified in the command config section 135. From the CID, the command handler 131 identifies the respective command module 136 from a plurality of command modules in the command descriptor section 134 and invokes the execution part of the command executed by the processor 136b. After execution is done, it then invokes the response processor 136c and sends result to the MCU 10.

The command factory 132 is a processor used for managing command descriptors. The command factory 132 is used to either update a command or add a new command. In a software implementation of the command factory 132, the command factory 132 includes procedures to load the software program (136a, 136b, 136c) in program memory and change the address of the software program in command descriptor section 134 to this new program.

While various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent on the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof, including any combination of a computing system, an integrated circuit, and a computer program on a non-transitory computer-readable recording medium. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments, a single act may include or may be broken into multiple sub acts. Such sub acts may be included and part of the disclosure of this single act unless explicitly excluded.

What is claimed is:

1. A radar monolithic microwave integrated circuit (MMIC), comprising:
   at least one of a transmit channel for transmitting radar signals or a receive channel for receiving reflected radar signals; and
   a configuration and sequencing circuit configured to receive and store a plurality of configuration commands corresponding to unique time-dependent functions, each configuration command corresponding to a different one of the unique time-dependent functions, wherein the configuration and sequencing circuit is configured to generate a unique command handle for each configuration command, and transmit the unique command handle for each configuration command to a controller,
   wherein the configuration and sequencing circuit is configured to receive and store a bundled configuration command comprising a plurality of unique command handles corresponding to a set of configuration commands, generate a unique bundled command handle for the bundled configuration command, and transmit the unique bundled command handle to the controller,
   wherein the configuration and sequencing circuit is configured to receive an execute command from the controller that includes the unique bundled command handle, wherein the execute command triggers the configuration and sequencing circuit to perform an execution flow of the unique time-dependent functions corresponding to the set of configuration commands associated with the unique bundled command handle.

2. The radar MMIC of claim 1, wherein the configuration and sequencing circuit is configured to transmit an execution result of the execution flow to the controller in response to completing the execution flow.

3. The radar MMIC of claim 1, wherein:
   each of the plurality of configuration commands includes a unique combination of a command identifier and a set of parameters that define at least one characteristic of a time-dependent function corresponding to the command identifier, and
   the unique combination of the command identifier and the set of parameters define a corresponding unique time-dependent function.

4. The radar MMIC of claim 3, wherein the command identifier corresponds to a single executable operation type.

5. The radar MMIC of claim 3, wherein the unique time-dependent functions include at least one of:
   a transmit calibration function for calibrating the transmit channel, a receive calibration function for calibrating the receive channel, a transmit monitoring function for monitoring the transmit channel, a receive monitoring function for monitoring the receive channel, a ramp function for generating ramp segments of a ramp signal, an event monitoring function for monitoring for a trigger event, a read function to read data from a read memory location of the radar MMIC, a write function to write data to a write memory location of the radar MMIC.

6. The radar MMIC of claim 1, wherein the configuration and sequencing circuit is configured to receive and store a loop configuration command that defines a unique number of loop iterations, generate a unique loop command handle for the loop configuration command, and transmit the unique loop command handle to the controller.

7. The radar MMIC of claim 6, wherein:
   the execute command includes the unique loop command handle and the unique bundled command handle, and
   the execute command triggers the configuration and sequencing circuit to perform the execution flow of the unique time-dependent functions corresponding to the set of configuration commands associated with the unique bundled command handle according to the unique number of loop iterations.

8. The radar MMIC of claim 1, wherein:
   the bundled configuration command is a batch configuration command comprising the plurality of unique command handles corresponding to the set of configuration commands, and
   the execution flow of the unique time-dependent functions corresponding to the set of configuration commands associated with the unique bundled command handle includes executing at least two of the unique time-dependent functions in sequential order.

9. The radar MMIC of claim 8, wherein the unique time-dependent functions corresponding to the set of configuration commands associated with the unique bundled command handle include a calibration function for calibrating at least one circuit component of the radar MMIC, a ramp function for generating ramp segments of a ramp signal, and a monitoring function for monitoring at least one result of the radar MMIC.

10. The radar MMIC of claim 8, wherein:
the unique time-dependent functions corresponding to the set of configuration commands associated with the unique bundled command handle include a first ramp function for generating first ramp segments of a first ramp signal and a second ramp function for generating second ramp segments of a second ramp signal, and
the first ramp signal is defined by a first set of parameters provided in a first configuration command and the second ramp signal is defined by a second set of parameters provided in a second configuration command, the first set of parameters being different from the second set of parameters.

11. The radar MMIC of claim 1, wherein:
the bundled configuration command is a batch configuration command comprising the plurality of unique command handles corresponding to the set of configuration commands, and
the execution flow of the unique time-dependent functions corresponding to the set of configuration commands associated with the unique bundled command handle includes executing at least two of the unique time-dependent functions in parallel.

12. The radar MMIC of claim 1, wherein:
the bundled configuration command is a fork configuration command comprising the plurality of unique command handles corresponding to the set of configuration commands that includes an event monitoring configuration command that defines a configured condition and at least two alternative execution flow paths of the execution flow corresponding to the configured condition.

13. The radar MMIC of claim 12, wherein:
the execution flow of the unique time-dependent functions corresponding to the set of configuration commands associated with the unique bundled command handle includes monitoring for the configured condition,
on a first condition that the configured condition is satisfied, executing a first unique time-dependent function corresponding to a first one of the at least two alternative execution flow paths of the execution flow, and
on a second condition that the configured condition is not satisfied, executing a second unique time-dependent function corresponding to a second one of the at least two alternative execution flow paths of the execution flow.

14. The radar MMIC of claim 13, wherein the configured condition is a temperature threshold of an internal temperature of the radar MMIC.

15. The radar MMIC of claim 14, wherein:
the first unique time-dependent function is a calibration function for calibrating at least one circuit component of the radar MMIC according to a first set of calibration parameters provided in a first configuration command, and
the second unique time-dependent function is a calibration function for calibrating the at least one circuit component of the radar MMIC according to a second set of calibration parameters provided in a second configuration command, the second set of calibration parameters being different from the first set of calibration parameters.

16. The radar MMIC of claim 12, wherein the execution flow of the unique time-dependent functions corresponding to the set of configuration commands associated with the unique bundled command handle includes monitoring for the configured condition and, on a condition that the configured condition is satisfied, executing one of the unique time-dependent functions.

17. A radar system, comprising:
a controller configured to generate a plurality of configuration commands corresponding to unique time-dependent functions, each configuration command corresponding to a different one of the unique time-dependent functions, generate a plurality of bundled configuration commands, each corresponding to a unique set of configuration commands, and generate a plurality of execute commands, each corresponding to a different one of the plurality of bundled configuration commands; and
a radar monolithic microwave integrated circuit (MMIC), comprising:
at least one of a transmit channel for transmitting radar signals or a receive channel for receiving reflected radar signals; and
a configuration and sequencing circuit configured to receive and store the plurality of configuration commands received from the controller, wherein the configuration and sequencing circuit is configured to generate a unique command handle for each configuration command, and transmit the unique command handle for each configuration command to the controller,
wherein the configuration and sequencing circuit is configured to receive and store a bundled configuration command received from the controller, the bundled configuration command comprising a plurality of unique command handles that indicate the unique set of configuration commands, generate a unique bundled command handle for the bundled configuration command, and transmit the unique bundled command handle to the controller,
wherein the configuration and sequencing circuit is configured to receive an execute command from the controller that includes the unique bundled command handle, wherein the execute command triggers the configuration and sequencing circuit to perform an execution flow of the unique time-dependent functions corresponding to the set of configuration commands associated with the unique bundled command handle.

18. The radar system of claim 17, wherein:
the configuration and sequencing circuit is configured to store configuration information of the plurality of configuration commands and corresponding unique command handles in a memory area, and store configuration information of the bundled configuration command and the bundled configuration command in the memory area,
the controller is configured to copy the memory area and write the copy of the memory area to the radar MMIC.

19. A method of configuring a radar monolithic microwave integrated circuit (MMIC) and executing configured commands, the method comprising:
receiving and storing a plurality of configuration commands corresponding to unique time-dependent functions, each configuration command corresponding to a different one of the unique time-dependent functions;

generating a unique command handle for each configuration command;

transmitting the unique command handle for each configuration command to a controller;

receiving and storing a bundled configuration command comprising a plurality of unique command handles corresponding to a set of configuration commands;

generating a unique bundled command handle for the bundled configuration command;

transmitting the unique bundled command handle to the controller; and receiving an execute command that includes the unique bundled command handle, wherein the execute command triggers execution of an execution flow of the unique time-dependent functions corresponding to the set of configuration commands associated with the unique bundled command handle.

20. The method of claim 19, wherein:

each of the plurality of configuration commands includes a unique combination of a command identifier and a set of parameters that define at least one characteristic of a time-dependent function corresponding to the command identifier, and the unique combination of the command identifier and the set of parameters define a corresponding unique time-dependent function.

21. The method of claim 19, wherein the unique time-dependent functions include at least one of:

a transmit calibration function for calibrating the transmit channel, a receive calibration function for calibrating the receive channel, a transmit monitoring function for monitoring the transmit channel, a receive monitoring function for monitoring the receive channel, a ramp function for generating ramp segments of a ramp signal, an event monitoring function for monitoring for a trigger event, a read function to read data from a read memory location of the radar MMIC, a write function to write data to a write memory location of the radar MMIC.

22. The method of claim 19, further comprising:

receiving and storing a loop configuration command that defines a unique number of loop iterations;

generating a unique loop command handle for the loop configuration command; and transmitting the unique loop command handle to the controller; and executing the execution flow according to the unique number of loop iterations, wherein the execute command includes the unique loop command handle and the unique bundled command handle.

* * * * *